United States Patent Office 3,314,109
Patented Apr. 18, 1967

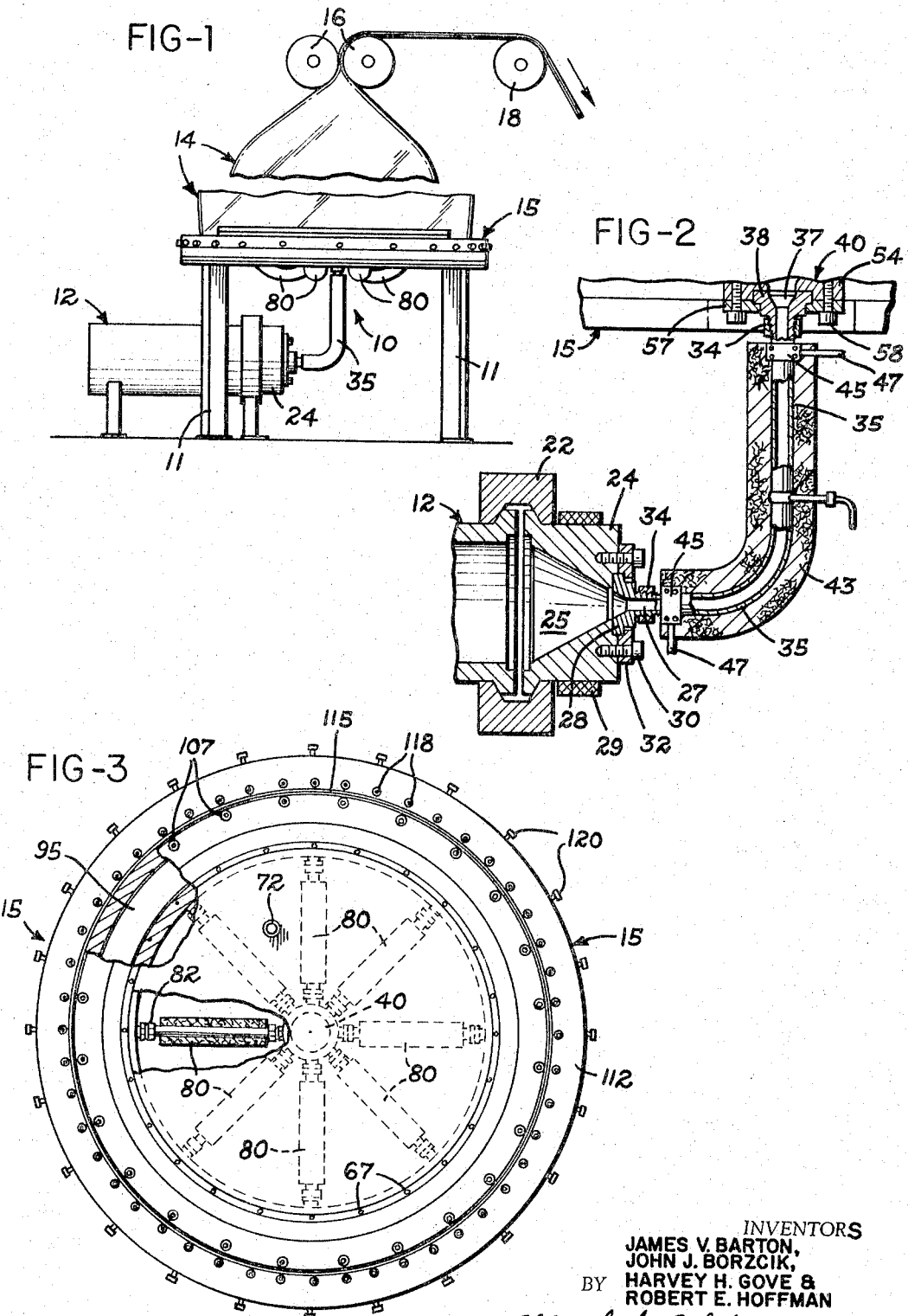

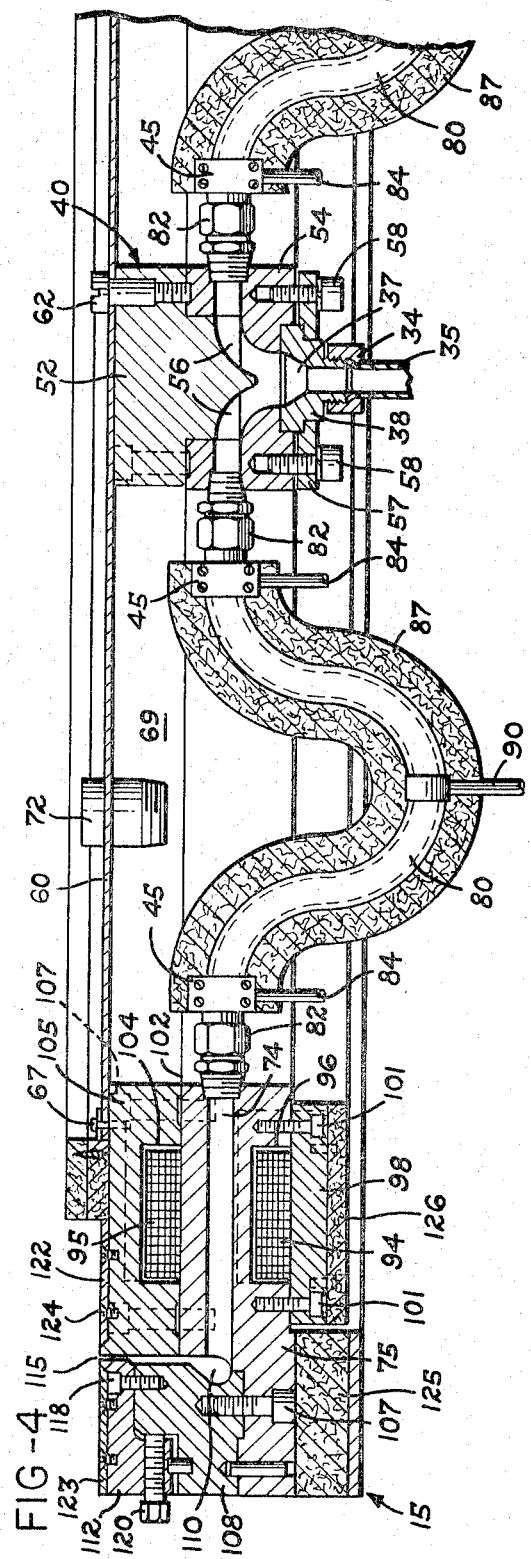
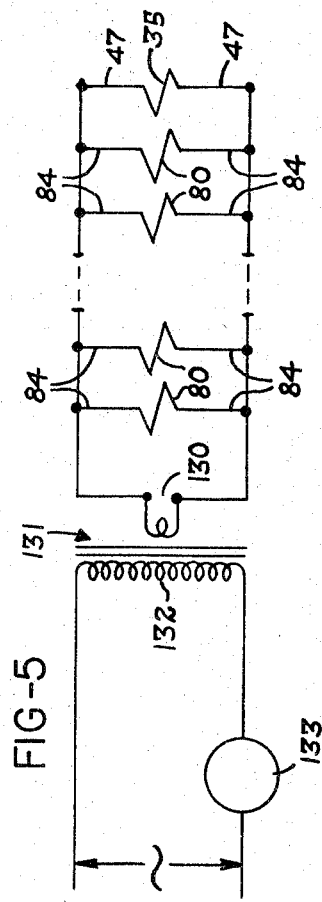
FIG-4
FIG-5

3,314,109
EXTRUSION DIE AND FEED APPARATUS
James V. Barton, John J. Borzcik, Harvey H. Gove, and Robert E. Hoffman, Hamilton, Ohio, assignors to The Black-Clawson Company, Hamilton, Ohio, a corporation of Ohio
Filed July 26, 1965, Ser. No. 474,616
9 Claims. (Cl. 18—14)

This invention relates to extruding thermoplastic material, and more particularly, to die and die feeding apparatus which is especially adapted for extruding films of large dimensions from thermoplastic such as polyethylene, polypropylene, polystyrene, polyvinyl chloride, and the like.

A relatively large extrusion die, such as, for example, a circular film die above twenty inches in diameter, is commonly constructed by assembling generally flat solid plates which cooperatively define an elongated die cavity and an extrusion orifice along with a series of internal passageways through which a plastic melt is fed into the die cavity from a suitable plastic source. Such a die construction is shown in Patent No. 3,123,699.

It is desirable to maintain the plastic melt at a uniform temperature as it flows through the die and thus commonly some means is provided for heating the die body adjacent the passageways and die cavity. As shown in the above mentioned patent, the heating of the die is accomplished by externally mounting a series of induction coils and flux guides on the die plates. In this manner, the entire die is heated, and with some plastic material temperatures approaching 700° F. are not uncommon.

Furthermore, to withstand the high internal pressure maintained on the plastic material within the die which is normally connected directly to a plastic extruder, the die plates are usually constructed with substantial thickness to provide the necessary rigidity. Thus with large circular dies, as for example, a die constructed as shown in the above patent with a seven foot diameter, the mass of the die becomes substantial and thus requires a substantial amount of electrical energy to heat the die. Also, the mass of a large die increases the problem of uniform heating necessary to prevent differential thermal expansion and contraction and thus prevent cracking of the die.

It is also desirable that the installation of a large extrusion die be simplified as much as possible so that the die can be easily connected to a plastic extruder without requiring precision alignment between the die and the discharge end of the extruder. Furthermore, the connection of the die to the extruder should provide some flexibility to accommodate relative thermal expansion and contraction between the die and the extruder.

Accordingly, it is one object of the present invention to provide an improved extrusion die and feed apparatus which is ideally suited for forming thermoplastic film of large dimensions while substantially reducing the overall mass and weight of the die and thereby reducing the energy and time required for heating the die.

It is another object of the invention to provide an improved extrusion die and feed apparatus as outlined above which maintains the plastic melt at a uniform temperature from the source of plastic melt until it is extruded through the elongated die orifice.

Still another object of the invention is to provide a novel circular extrusion die which is especially adapted for producing tubular films of large diameters, and which substantially eliminates the problem of die cracking due to differential thermal expansion and contraction.

A further object of this invention is the provision of a circular film die in which an annular die body is fed from a central manifold through a plurality of separate conduits which feed the plastic material into the die body at transversely or arcuately spaced positions.

Another object of the invention is the provision of a die and a heating arrangement therefore which is particularly adapted for the extruding of films of large dimensions, in which a plurality of separate feed conduits feed the die body at transversely spaced positions, and in which each of the feed conduits is heated by direct low voltage resistance heating maintaining each of the separate conduits at a uniform temperature.

It is also an object of the invention to provide an improved circular extrusion die and feed apparatus for producing tubular plastic film wherein the plastic material or melt is fed to the die through a series of radially extending conduits which are resistance heated by causing a high amperage electrical current to flow through each of the conduits.

A further object of the present invention is to provide an improved extrusion die and feed apparatus as outlined above which also includes resistance heating of a conduit connecting the discharge end of an extruder with a distribution manifold.

Other objects and advantages of the invention will be apparent from the following description, the accompanying drawings and the appended claims.

In the drawings:

FIG. 1 is a schematic elevational vew of a circular extrusion die constructed in accordance with the present invention and connected to the discharge end of a plastic extruder;

FIG. 2 is a detailed view in axial section of the connection between the discharge end of the extruder and the distribution manifold for feeding material to the die;

FIG. 3 is a plan view partially in section of the circular extrusion die shown in FIG. 1;

FIG. 4 is an enlarged detailed cross-sectional view of the circular extrusion die of FIG. 1 showing a typical heated conduit for feeding plastic melt from a central manifold to an annular die body; and FIG. 5 is a schematic electrical diagram for the resistance heating of the conduits which uniformly distribute the hot plastic material to the die.

Referring to the drawings which illustrate a preferred embodiment of the present invention, a circular film die and feed apparatus 10 constructed in accordance with the invention is shown in FIG. 1 supported by the legs 11 and connected to a plastic extruder 12 for forming a tube 14 of plastic film. The tube is directed upwardly from the annular die 15 which will be described later, and is received between two squeeze or pinch rolls 16 which flatten the tube after which it is directed over a guide roll 18 for further handling such as winding onto a suitable takeup roll (not shown). The detailed description of the apparatus which follows will begin with the extruder 12 and proceed to the die 15 along the flow path of the plastic melt.

As shown in FIG. 2, mounted on the discharge end of the extruder 12 by a clamping member 22 is an adaptor 24 which defines a conical-shaped cavity 25 for directing the plastic material through a discharge outlet 27 formed within a fitting 28. Preferably the adaptor 24 is heated as by an induction heater or by a suitable band type heating element shown diagrammatically at 29. A series of screws 30 secure a retaining plate 32 which clamps the fitting 28 against the end of the adaptor 24.

Connected to the outer end of the fitting 28 by a threaded coupling 34 is a feed conduit 35 which directs the plastic melt from the discharge outlet 27 of the extruder 12 to an inlet 37 formed within a fitting 38 mounted on the bottom of a central distribution manifold 40 for the die 15. Another coupling 34 connects the tube or conduit 35 to the fitting 38.

Surrounding the feed conduit 35 is a uniform layer of suitable insulation 43 which is provided to minimize the heat transfer from the conduit 35 to the surrounding atmosphere. Secured to the ends of the feed conduit 35 adjacent the corresponding couplings 34 and 38 are clamp-type electrical connectors 45 to which electrical leads or conductors 47 are attached. As will be explained later, the feed conduit 35 is direct resistant heated by supplying a suitable low-voltage current to the leads 47. Preferably the conduit 35 is formed from 1020 stainless steel seamless tubing to provide the desired electrical resistance and corrosion resistance.

Referring to FIGS. 3 and 4, the distribution manifold 40 is centrally spaced within the die 15 and is constructed by assembling an upper deflector member 52 to a lower adaptor 54. The adaptor 54 has a plurality of generally radially extending outlets 56 which are uniformly spaced around the manifold 40 for uniformly distributing the plastic melt received within the inlet 37. A retaining plate 57 clamps the fitting 38 to the bottom of the adaptor member 54, and is secured thereto by a series of screws 58.

As shown in FIG. 4, the manifold 40 is supported in the center of a circular top or air sealing plate 60 by a series of screws 62. The outer edge portion of the plate 60 is mounted on the annular die 15 by a series of screws 67. The die 15 cooperates with the centrally positioned hub-like manifold 40 to define an annular space 69 therebetween. Mounted within the sealing plate 60 is a tube 72 through which air is fed to expand the plastic tube 14 as it is extruded from the die 15 for enlarging the diameter of the tube immediately after it is extruded. This method is commonly used to form a large tube from a die having a substantially smaller diameter.

Connecting each of the radially extending outlets 56 formed within the manifold 40 to a corresponding inlet passageway 74 formed within the annular body 75 of the die 15 is a separate trap or U-shaped feed conduit 80. As shown in FIG. 3, the annular die body 75 is essentially open in the center and the feed conduits 80 lead in spider or spoke like fashion from the central manifold 54 to the die body 75 in the open space 69 provided within the die body, and open into the passageways 74 in the die body at transversely spaced positions with respect to the die body and with respect to the extruding orifice manifold, for the purpose of providing substantially uniform distribution of the plastic melt into the die body. By this arrangement of feeding from the central manifold through a plurality of separate feed tubes, the central mass of the circular film die which would normally occupy the annular space 69 is eliminated and there is accordingly less mass of die body to be heated and substantially less danger of cracking of the die body due to the differential thermal expansion and contraction.

Each conduit 80 has a threaded fitting 82 mounted on each end for connecting the conduits 80 for fluid communication with the respective outlets 56 and inlet passageways 74. As shown in FIG. 3, a series of eight conduits 80 have been found desirable for feeding plastic material to a die having a seventy-two inch diameter orifice. It is to be understood, however, that more or less conduits 80 may be employed depending upon the desired size and capacity of the die 15.

Mounted adjacent each of the ends of the U-shaped conduits 80 adjacent the fittings 82 are additional clamp-type electrical connectors 45 by which the electrical conductors or leads 84 are attached to each end of the conduits 80. Preferably the U-shaped conduits 80 are formed from the same stainless steel seamless tubing material which is used for forming the feed conduit 35, and the developed length of each of the U-shaped conduits 80 and the conduit 35 is the same so that each of the conduits has substantially the same electrical resistance.

As illustrated in FIGS. 3 and 4, each of the U-shaped conduits 80 are encased by a uniform layer of insulation 87, to prevent significant heat loss. The U-shaped configuration of the conduits 80 provides the same flexibility and has been found desirable not only for conveniently connecting the conduits 80 to the manifold 40 and the die body 75, but also to provide for the free differential thermal expansion and contraction between the circular die 15 and the manifold 40.

Connected to the center portion of each of the U-shaped conduits 80 to the center portion of the feed conduit 35 are thermocouples 90 which are used cooperatively to control precisely the temperature of the plastic melt as it flows from the extruder 12 to the die 15.

The die body 75 is maintained at a uniform temperature preferably by induction heating. While the die may be heated with the external induction heating arrangement shown in the U.S. Patent 3,123,699, it has been found preferable, in many instances, to place the induction heating coils within the die body itself. Accordingly, there are provided two annular induction heating coils including a lower coil 94 and an upper coil 95 which are effectively buried or received within the die 15. As shown in FIG. 4, the die body 75 is provided with an annular downwardly opening U-shaped channel 96 which receives the induction heating coil 94. An annular plate 98 supports the coil 94 and is secured to the die body 75 by a series of screws 101, and forms an effective flux guide or closed flux path with the die body 75.

The upper induction heating coil 95 is received on the upper planar surface 102 of the die body in axially spaced relation to the lower coil 94, with the result that the induction heating coils 94 and 95 are received, respectively, below and above the radial passageways 74. The upper coil 95 is received within an annular U-shaped chamber 104 formed within an annular die ring 105 which forms an integral part of the die 15 and is secured to the body 75 by a series of screws 107. The ring also forms an effective flux guide for closing the flux path about the induction heating coil 95.

The induction heating coils 94 and 95 are preferably formed of copper wire with a high temperature, class H insulation and are connected to a suitable source of alternating current, such as 220 or 440 volt sixty cycle A.C. As desired, the coils may be formed of anodized aluminum wire or tape as disclosed and claimed in the copending application of Schroyer Ser. No. 432,537, filed Feb. 15, 1965, and assigned to the same assignee as this invention.

Mounted on the upper surface of the outer portion of the die body 75 and secured thereto by another series of screws 107 is an outer die ring 108 which cooperates with the inner die ring 105 to form an annular extruding cavity 110. The eight inlet passageways 74 are uniformly spaced around the die body 75 for uniformly feeding the cavity 110 with the material supplied through the corresponding U-shaped conduits 80 from the manifold 40.

Mounted on the upper surface of the outer die ring 108 is an annular lip member 112 which cooperates with the inner die ring 105 to define an elongated annular extrusion orifice 115 through which the plastic melt is extruded to form the tube 14. The lip member 112 is secured to the outer die ring 108 by a series of screws 118 which may be loosened for adjusting the concentricity of the parts by adjustment of the screws 120. Preferably, the top surface of the inner die ring 105 and outer lip member 112 are covered by the corresponding annular insulation sheets 122 and 123 which are secured by the screws 124. Sheets 125 and 126 of insulation also cover the bottom of the die.

Preferably, the U-shaped conduits 80 and the single or central feed conduit 35 are connected electrically in parallel as shown diagrammatically in FIG. 5, across the secondary 130 of the step-down transformer 131. However, it is within the scope of this invention to connect the individual conduits to be heated in series or in combination series-parallel relationships to the end that the same effective amount of heating is applied to each of the conduits due to the I²R losses in the conduit material as the current passes therethrough.

The leads 47 and 84 connected to the ends of the conduits are made sufficiently heavy so that the resistance losses in the leads form a small part of the transformer output. Further, each of these leads are preferably of the same length, as are the individual conduits 80 and 35. Accordingly, when these parts are connected in parallel, as shown in FIG. 5, approximately the same current will flow through each of the parallel paths formed thereby. In order to assure a balanced condition, it is preferable to bring each of the leads 84 and 47 individually back to the terminals of the secondary 130. The voltage on this primary 132 may be conveniently controlled by a voltage control device 133 to vary the power input to the transformer 131.

As an example, a seventy-two inch diameter die may be heated from an alternating current source by a 15 kva. transformer. The output of the transformer will supply a high current in the order of 2000–3000 amperes at six to three volts. The resistance of one of the conduits 35 or 80 may be in the order of 0.0012 ohm.

By employing this low voltage and high current for the resistance heating of the conduits 35 and 80, it has been found that the plastic material can be distributed from the outlet 27 of the extruder 12 to the radially extending inlet passageway 74 of the die 15 at a substantially uniform temperature around the entire periphery of the die 15. Then by employing the annular induction heating coils 94, it has been found that the plastic material is maintained at a uniform temperature within the die cavity 110 until it is discharged from the annular extrusion orifice 115.

From the drawings and the above description, it can be seen that a film die and feed apparatus formed in accordance with the invention provides several desirable features and advantages. For example, by constructing an annular shaped tube die which eliminates the central portion of the die it has been found that there is no significant problem of differential thermal expansion and contraction which has previously presented a problem of cracking of large tube dies. Furthermore, by eliminating the central mass of die material it is no longer necessary to attempt uniform heating of this portion of the die.

Thus by feeding the plastic material from the discharge outlet 27 of the extruder 12 or other plastic melt supply source to the die 15 through the individually heated U-shaped conduits 80 and the feed conduit 35, it has been found that the plastic material is distributed to the die cavity 110 at a substantially uniform temperature. This is provided by connecting the lead 47 for heating the feed conduit 35 in parallel with each of the leads 84 for heating the U-shaped conduits 80.

By this parallel arrangement, it can be seen that each of the identical conduits 80 and the conduit 35 will be subjected to a uniform voltage which, in turn, provides for uniform heating of the conduits. Since only the material making up the conduits is heated, the most efficient use is made of the available heating energy while providing for the uniform distribution of the plastic material to the die.

Another desirable feature is provided by the slight flexibility of the independent conduits 35 and 80 by eliminating the requirement for precision alignment of the die 15 in relation to the manifold 40 and the extruder 12. This provides for a less costly and more convenient installation of the die and feed apparatus.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An improved die and feed apparatus for extruding a film of hot thermoplastic material and especially adapted to maintain the material at a uniform temperature while feeding a die of large size to provide a smooth and consistent flow of material from the die, said apparatus comprising a die having means defining an elongated cavity and extrusion orifice, means defining a plurality of spaced apart inlet passageways within said die for directing material into said cavity, means for heating said die adjacent said cavity and said inlet passageways, manifold means defining an inlet for receiving material while in a hot plastic state and further including means defining a plurality of outlets in communication with said inlet for uniformly distributing material received within said inlet, means including a corresponding plurality of discrete tubular conduit members connecting said outlets within said manifold means to said inlet passageways within said die, and means for separately and individually heating each said conduit member so that the plastic material is supplied at a uniform temperature from said manifold means to said cavity through said plurality of inlet passageways.

2. Apparatus as defined in claim 1 wherein said conduit members are formed of metal and adapted for connection directly to a source of low voltage, high amperage power for the direct resistance heating of the contents thereof.

3. Apparatus as defined in claim 1 wherein each said conduit members are formed of metal having substantially the same electrical resistance, and including electrical wiring means for connecting said members in parallel to an electrical power source for uniformly heating the material flowing within said conduit members.

4. An improved die and feed apparatus for extruding tubular film from thermoplastic material and especially adapted to maintain the material at a uniform temperature while feeding a die of large size to provide a smooth and consistent flow of material from said die and to prevent cracking of the die due to differential thermal expansion and contraction, said apparatus comprising an annular die having means defining an annular cavity and an extrusion orifice, means defining a plurality of inlet passageways spaced apart around said die for directing material uniformly into said cavity, means for heating said die adjacent said cavity and said inlet passageways, means including a corresponding plurality of discrete tubular conduit members connecting said inlet passageways within said die to a source of plastic material and adapted to provide for thermal expansion and contraction of said die, and means for separately heating each said conduit member so that plastic material is supplied to said annular cavity at a uniform temperature.

5. Apparatus as defined in claim 4 wherein said conduit members are electrically conductive and including electrical wiring means connecting said conduit members as resistances to an electrical power source for uniformly heating the material flowing within said conduit members.

6. Apparatus as defined in claim 4 wherein said means for heating said die adjacent said cavity and said inlet passageways include annular induction coil means embedded within the die so that the die forms an effective flux guide.

7. An improved die and feed apparatus for extruding tubular film from thermoplastic material and especially adapted to maintain the material at a uniform temperature while feeding a die of large size to provide a smooth and consistent flow of material from said die and to prevent cracking of the die due to differential thermal expansion and contraction, said apparatus comprising an annular die having means defining an annular cavity and an extrusion orifice, means defining a plurality of inlet passageways spaced apart around said die for directing material uniformly into said cavity, means for heating said die adjacent said cavity and said inlet passageways, a manifold positioned generally centrally in relation to said annular die body, means defining an inlet in said manifold for receiving material while in a hot plastic state, said manifold including means defining a plurality of outlets in communication with said inlet for uniformly distributing a material received within said inlet, means including a corresponding plurality of discrete tubular conduit members connecting said outlets in said manifold to said inlet passageways within said die and adapted to provide for thermal expansion and contraction of said die, and means for separately heating each said conduit member so that plastic material is supplied to said annular cavity at a uniform temperature.

8. An improved die and feed apparatus for extruding tubular film from thermoplastic material and especially adapted to maintain the material at a uniform temperature while feeding a die of large size to provide a smooth and consistent flow of material from said die and to prevent cracking of the die due to differential thermal expansion and contraction, said apparatus comprising an annular die having means defining an annular cavity and an extrusion orifice, means defining a plurality of inlet passageways spaced apart around said die for directing material uniformly into said cavity, means for heating said die adjacent said cavity and said inlet passageways, a manifold positioned generally centrally in relation to said annular die body, means defining an inlet in said manifold, a metal feed conduit connecting said inlet in manifold to a source of hot plastic material, said manifold including means defining a plurality of outlets in communication with said inlet for uniformly distributing the material received within said inlet, means including a corresponding plurality of discrete tubular metal conduit members connecting said outlets in said manifold to said inlet passageways within said die and adapted to provide for thermal expansion and contraction of said die, each said conduit member and said feed conduit having the same length, and means for direct resistance heating each said conduit member and said feed conduit so that plastic material is supplied to said annular cavity at a uniform temperature.

9. An improved die and feed apparatus for extruding tubular film from thermoplastic material and especially adapted to maintain the material at a uniform temperature while feeding a die of large size to provide a smooth and consistent flow of material from said die and to prevent cracking of the die due to differential thermal expansion and contraction, said apparatus comprising an annular die having means defining an annular cavity and an extrusion orifice, means defining a plurality of radially extending inlet passageways spaced apart around said die for directing material uniformly into said cavity, means for heating said die adjacent said cavity and said inlet passageways, a manifold positioned centrally in relation to said annular die body and in a common plane therewith, means defining an inlet in said manifold, a feed conduit connecting said inlet in said manifold to a source of hot plastic material, said manifold including means defining a plurality of radially extending outlets in communication with said inlet for uniformly distributing material received within said inlet, means including a corresponding plurality of generally U-shaped tubular metal conduit members connecting said outlets in said manifold to said inlet passageways within said die and adapted to provide for thermal expansion and contraction of said die, and electrical wiring means connecting said conduit members and said feed conduit as resistances in parallel to a low voltage power source for uniformly heating the material flowing within said conduit members and said feed conduit so that the plastic material is supplied to said annular cavity at a uniform temperature.

References Cited by the Examiner

UNITED STATES PATENTS

| | | | |
|---|---|---|---|
| 2,574,907 | 11/1951 | Bucksen | 18—12 |
| 2,688,154 | 9/1954 | Huckfeldt. | |
| 3,055,053 | 9/1962 | Livingston et al. | 18—12 |
| 3,123,699 | 3/1964 | Stephenson et al. | 18—14 XR |
| 3,129,459 | 4/1964 | Kullgren et al. | 18—12 |
| 3,212,134 | 10/1965 | Yokana | 18—14 |

WILLIAM J. STEPHENSON, *Primary Examiner.*